G. H. CURTISS.
TRIPLANE SPEED SCOUT.
APPLICATION FILED DEC. 22, 1916.
1,316,278.
Patented Sept. 16, 1919.
3 SHEETS—SHEET 1.
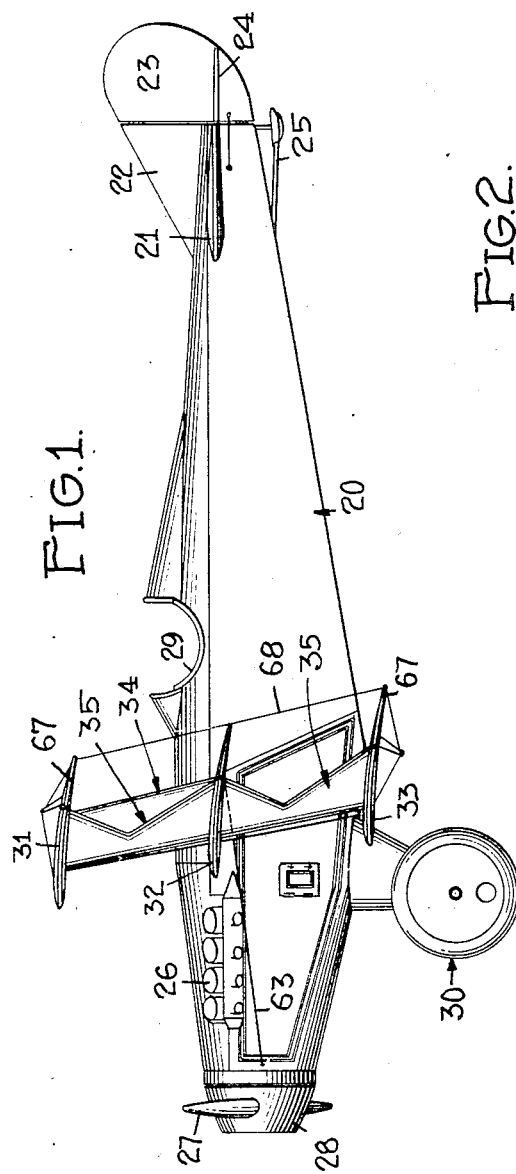
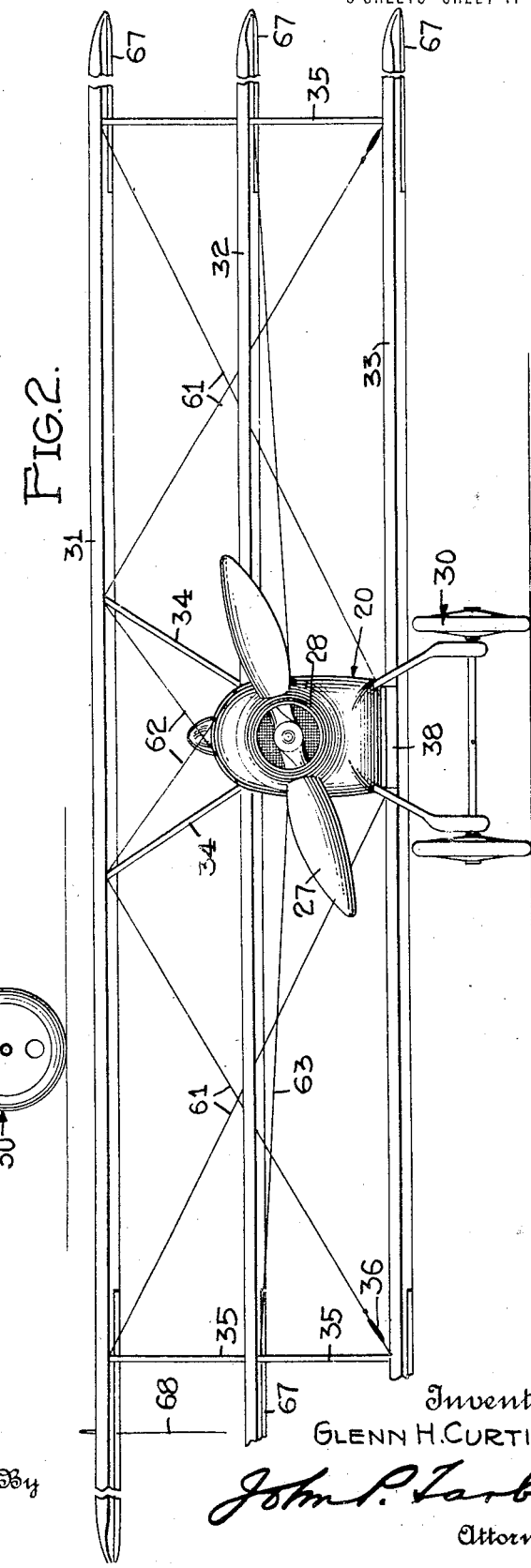
Inventor
GLENN H. CURTISS.
By John P. Tarbox
Attorney

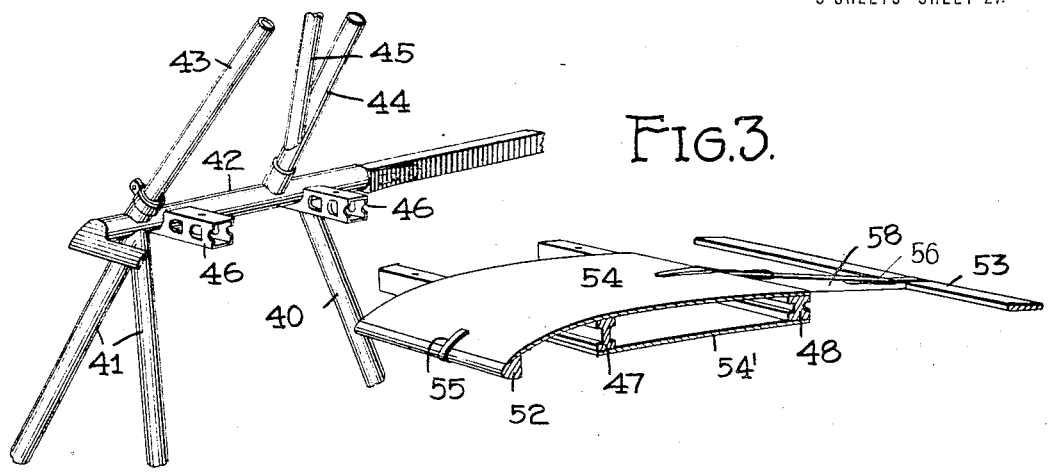
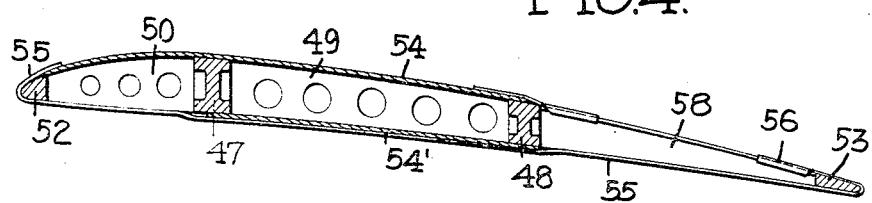
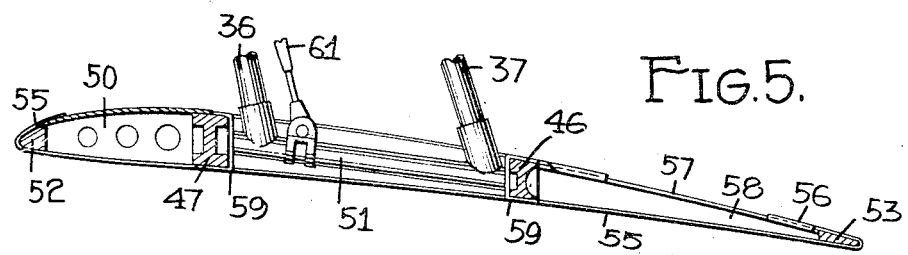
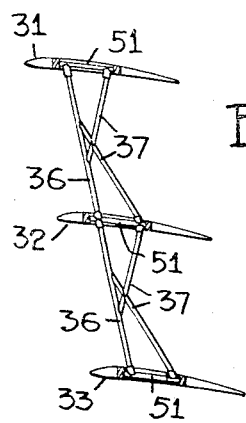
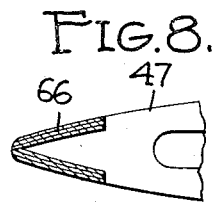

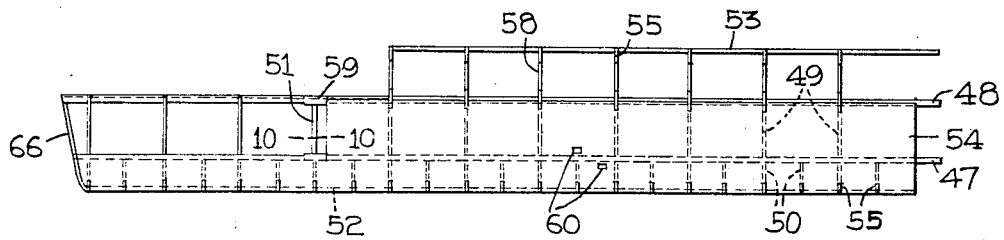
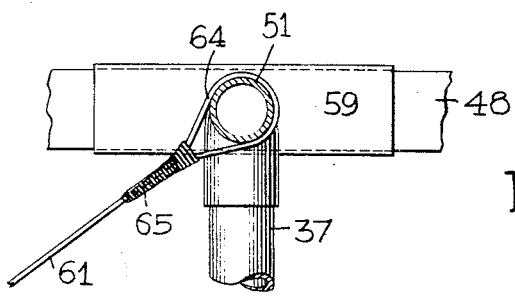
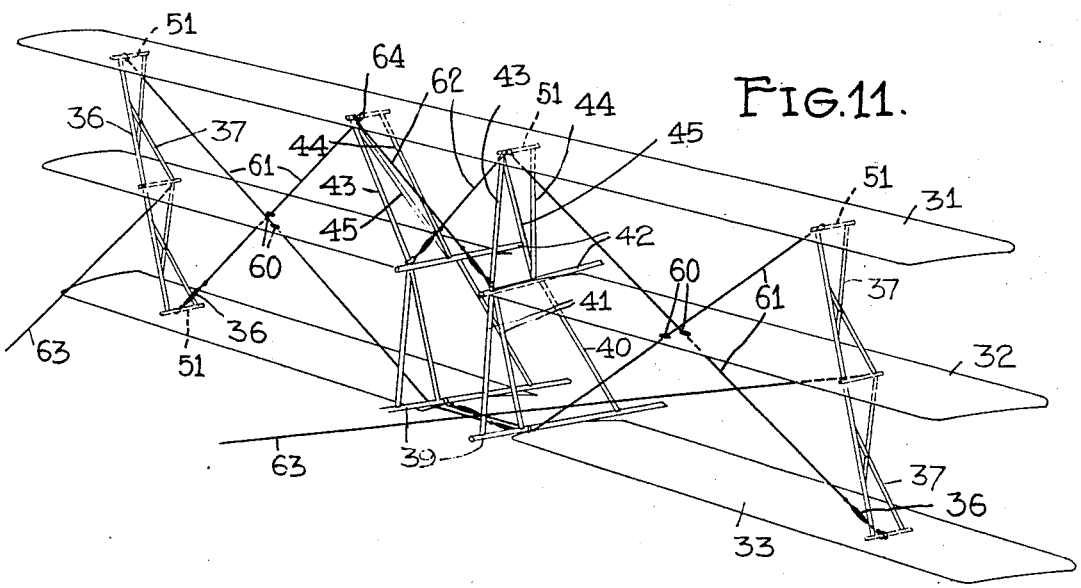

UNITED STATES PATENT OFFICE.

GLENN H. CURTISS, OF BUFFALO, NEW YORK, ASSIGNOR TO CURTISS AEROPLANE AND MOTOR CORPORATION, A CORPORATION OF NEW YORK.

TRIPLANE SPEED-SCOUT.

1,316,278.  Specification of Letters Patent.  Patented Sept. 16, 1919.

Application filed December 22, 1916. Serial No. 138,498.

*To all whom it may concern:*

Be it known that I, GLENN H. CURTISS, a citizen of the United States, residing at Buffalo, in the county of Erie and State of New York, have invented certain new and useful Improvements in Triplane Speed-Scouts, of which the following is a specification.

My invention relates to military aircraft and has reference more particularly to aeroplanes of the scout or reconnaissance type. Military machines are principally employed in present day warfare for locating gun positions, directing gun fire, following up and harassing bodies of troops in retreat, etc., The wider field of operations, however, involves the use of high speed machines for reconnoitering the strategic positions of the enemy forces at points remote from the opposing line. These and other uses characterize aircraft constructed for military use.

To escape, in the event of attack, scout or reconnaissance craft must rely upon speed and maneuvering ability. An attempt to give battle would result in destruction and death. For this reason speed must be considered the all important characteristic of scout aeroplanes. The present invention aims to increase the flying speed of aeroplanes by minimizing the flight resisting surfaces without depreciating useful lift. To do this the chord of the supporting surfaces is reduced and the number of surfaces increased. By reducing the chord or depth of the supporting surfaces, the efficiency of the wing cell as a whole is increased markedly, the required number of wing posts may be reduced, the wing structure strengthened and the lift force concentrated for greater stability.

It is proposed, therefore, first so to arrange the wings or supporting surfaces of the wing structure as to locate the intermediate surface along the neutral axis thereof; second, to arrange the lift and drop wires of said structure in a manner providing for a decreased resistance to flight; third, to lighten and at the same time improve the construction of the wings by eliminating all interior wiring and constructing the wing frame as a box-beam; fourth, to substitute for the present types of wing post an improved wing post of K or similar form; and finally, to improve generally the aeroplane and wing structure whereby greater efficiency and decreased resistance will result. By "the neutral axis of the wing structure" is meant the axis or point at which the tension and compression stresses are equilibrated.

In describing the invention in detail, reference will be had to the accompanying drawings wherein like characters designate like or corresponding parts throughout the several views, of which:

Figure 1 is a side elevation of the improved machine;

Fig. 2 is a front end elevation;

Fig. 3 is a view illustrating fragmentarily and in perspective a portion of the engine section of the fuselage and a portion of the intermediate plane or wing;

Fig. 4 is a cross section of the wing;

Fig. 5 is a similar view illustrating the wing post connection;

Fig. 6 is a cross section of the wing structure;

Fig. 7 is a view illustrating fragmentarily a portion of the engine section and in cross section the upper plane;

Fig. 8 is a detail of one of the wing spar terminals;

Fig. 9 is a plan view of one of the aeroplane wings with its fabric covering removed;

Fig. 10 is an enlarged section on the line 10—10 of Fig. 9, and

Fig. 11 is a perspective view illustrating diagrammatically the wing structure.

Upon reference to Figs. 1 and 2 of the drawings it will be noted that the craft is stripped of all unnecessary structure and streamlined effectually throughout. Three superposed supporting surfaces or wings characterize the machine, the said surfaces extending intermediately across the body of the craft respectively above, below and intermediate the top and bottom thereof.

The fuselage or body of the craft I have designated in its entirety by the numeral 20. At its tail end the fuselage is equipped with the usual empennage which may be generally described as comprising a horizontal stabilizer 21, a vertical stabilizer 22, a rudder 23, and elevator flaps 24. Beneath the empennage a tail skid 25 is disposed. At its opposite or forward end and interiorly of the fuselage the motor 26 is mounted and in advance of the motor a tractor propeller 27. If desired, the propeller 27 may be equipped with a substantially frusto-conical hood 28 of appropriate streamline form. Aft of the supporting surfaces a cockpit 29 is provided.

Such features of the craft as have been previously described form no part of the present invention. The landing gear or undercarriage designated in its entirety by the numeral 30 is described and claimed in a copending application, S. N. 130,810, filed November 11, 1916.

The supporting surfaces are of equal aspect ratio and equidistantly spaced. Said surfaces I have designated respectively 31, 32 and 33. Considering the three surfaces as a unit and referring to the same hereafter as a wing structure it will be noted that the intermediate surface 32 is located along the neutral axis of said structure or at such a point with respect to the top plane 31 and lower plane 33 as to equilibrate the tension and compression stresses. In flight, the top plane is under compression and the lower plane under tension. Because of this uniform distribution of the surface area, rigid trussing or tying of the wing structure is made possible without interconnecting respectively the upper and intermediate plane and the lower and intermediate plane. The tie wires may interconnect directly the upper and lower planes.

But four wing posts are employed in the present machine, two being located laterally of the fuselage and adjacent the wing tips and two substantially centrally of the machine. These center wing posts, designated 34 interconnect respectively the fuselage and the upper wing. To provide for an unobstructed observation range directly ahead the said posts 34 diverge or extend angularly laterally from the fuselage to said upper wing. The cockpit 29 it will be noted, is located immediately aft of the space intermediate the respective diverging posts. Moreover, greater strength is obtained by the flaring arrangement disclosed.

The outer or terminal wing posts designated 35 interconnect respectively the superposed wings, the posts interconnecting the lower and intermediate wings being vertically alined and integrally united with the corresponding posts intermediate the upper and intermediate wings. These posts in each instance are of substantially K-form and may be generally described as comprising substantially vertical portions 36 and diagonals 37, the latter constituting wing post braces. The braces 37 intersect and engage with the vertical portion 36 of the wing post at one end and from their points of intersection extend angularly respectively upwardly and downwardly for termination at points in engagement respectively with the wings considerably aft of the vertical portions 36 which together with the braces constitute the wing posts 35. The said posts 35 may be described as continuous from the upper to the lower wing, each post comprising or including in its *ensemble* an element of each wing. The supporting surfaces, 31, 32 and 33, as intimated, are constructed substantially in duplicate. Actually, however, the intermediate wing 32 and the lower wing 33 differ somewhat in that the intermediate wing is interrupted in its continuity by the fuselage 20 and the lower wing partially interrupted by reason of the cutout 38 in its leading edge beneath the fuselage. The wing beams of the lower wing, like the corresponding beams of the upper wing extend continuously from tip to tip.

The engine section of the fuselage illustrated diagrammatically in Fig. 11 is constructed preferably of metal tubing integrally united throughout. The lower longerons, the fuselage struts, rear and forward, and upper longerons of the engine section have been designated respectively 39, 40, 41 and 42. Said center wing posts 34 continue laterally angularly with respect to the fuselage struts 40 and 41 without the fuselage for termination at the upper wing. Each center wing post comprises united or integrally welded wing post parts, the forward portion or part 43 continuing the forward fuselage struts 41, the aft portion or part continuing the rear fuselage strut 40 and the remaining portion or part 45 diagonally interbracing said first two parts. Lightened wing beam sockets 46 are formed integrally upon the engine section portion of the upper longerons 42. These sockets extend laterally and oppositely from the respective longerons to receive the inner terminals of corresponding wing beams of the intermediate wing. For an understanding of the particular arrangement disclosed reference should be had to Fig. 3.

Each supporting surface or wing is constructed of wing beams 47 and 48 (channeled of lightened), lightened web strips 49, similarly formed nose strips 50, compression members or tubes 51, an entering edge strip 52, and a trailing edge strip 53, the entering edge strip continuing at the wing tips aft for securement to the trailing edge strip as illustrated in Fig. 9.

Ordinarily, the veneering or inner wing covering terminates aft in the plane of the forward wing beam, the said veneering commencing at the entering edge strip 52. In present instance, however, the veneering on the upper side of the wing designated 54, extends beyond the forward wing beam 47 for termination in the plane of the rear wing beam 48 to which it is secured by any suitable means. Said veneering, together with a veneering strip 54' arranged to extend from beam to beam on the under side of the wing, strengthens the structure throughout, and provides for the elimination of all drift wires. In fact, the wing frame may be considered a hollow box-beam of considerable depth. The web strips 49 and the nose strips 50, with the several longitudinals of the wing constitute a foundation for this veneering and for the fabric covering (undesignated) of the wing. Metal strips 55 underlie the several web and nose strips and overlap respectively the entering edge strip and trailing edge strip as seen in Fig. 4. By this arrangement the terminals of the said metal strip may be described as reversely extending. Said strips effectually transversely brace the wing and steadfastly secure the underneath veneering. The fastening means for the strips 55 may be of any character desired but it is preferred that the rear terminals of the said strips be enlarged as indicated at 56 and folded (see Figs. 4 and 5) for securement beneath the cap strips 57 of the web strips 58 located intermediate the rear wing beam and the trailing edge strip of the wing.

This, it is believed is the first instance of a wing frame constructed as a box-beam. The veneering 54 and 54' together with the beams 47 and 48 constitute said box-beam and provide for a complete elimination of drift wiring in the wing. Drift strains are in this manner effectually borne by a materially lightened wing.

The number of compression members used in constructing the several wings are at variance. In the upper wing, there are four and in the intermediate and lower wings but two. These compression members afford anchorages for the respective wing post terminals. Appropriate clips 59 arranged to straddle the beams 47 and 48 provide a fastening means for the members 51 which are welded, brazed or otherwise integrally united to the wing posts of which they may be considered respectively a part.

Apertures 60 are formed in the intermediate wing, two at each side of the center, and one in each instance forwardly of the forward wing spar 47 and one in each instance aft of said spar. These openings permit a direct interbracing of the upper and lower wings by cross arranged tie wires 61. Terminally, these wires 61 engage respectively the outer wing posts 35, center wing posts 34 and lower longerons 39 of the engine section. The wires which extend from the upper wing inwardly extend beyond the adjacent lower longerons of the fuselage for securement to the remote corresponding longerons thereof. By this arrangement, the tension of the lower surface is partly borne by the wires 61. Additional cross arranged wires 62 interconnect respectively the outer terminals of the center wing posts 34 with the inner terminals thereof. The anchorages for all tie wires are located interiorly of either the fuselage or the wings. If desired, drift wires 63 may extend from the nose of the fuselage rearwardly outwardly to the intermediate plane and to the outer wing post 35.

A fastening for the several tie wires is obtained by passing the terminal of the wire as indicated at 64 around the compression member to which it is anchored and thereafter wrapping the folding end as indicated at 65. The foregoing and other details such as the tapering wing beam terminals illustrated in Fig. 8 characterize the machine. At said tapered terminals the wing beams are reinforced by reinforcing laminated strips 66.

Control is obtained through manipulation of the rudder 23, elevator flaps 24 and ailerons 67. Preferably, the ailerons are disposed at the tips of each wing, the superposed ailerons being connected as indicated at 68 for simultaneous and corresponding movement.

While in the foregoing I have disclosed more or less detailed forms of construction in presenting the preferred embodiment of my invention, it is desired to point out that certain constructional changes may be made from time to time without in any way departing from the genuine spirit of the invention as set forth in the subjoined claims.

What is claimed is:

1. A wing structure for airplanes including three or more relatively fixed supporting surfaces, wing posts rigidly connecting adjacent supporting surfaces, and wiring for the wing structure connecting non-adjacent supporting surfaces the wiring being intermediately located between the leading edges and trailing edges of the supporting surfaces and with the wing posts constituting a rigid truss whereby the total number of supporting surfaces is fixed relatively to each other.

2. In an aircraft, the combination of three or more relatively fixed supporting surfaces, wing posts rigidly connecting adjacent supporting surfaces, and lift and drop wires rigidly connecting non-adjacent supporting surfaces and respectively penetrating one or more of the supporting surfaces intermediately located between them.

3. In an aircraft, the combination of three or more relatively fixed supporting surfaces, wing posts rigidly connecting adjacent supporting surfaces, and lift and drop wires rigidly connecting non-adjacent supporting surfaces and respectively penetrating one or more of the intermediately located supporting surfaces without connection with it or them at the points of penetration.

4. In an aircraft, the combination of three or more relatively fixed supporting surfaces, wing posts rigidly connecting adjacent supporting surfaces and lift and drop wires rigidly connecting non-adjacent supporting surfaces, the arrangement of the wires being such that they pass through the intermediately located supporting surface or surfaces intermediate its or their leading and trailing edges.

5. In an aircraft, the combination with three or more relatively fixed supporting surfaces, wing posts rigidly connecting adjacent supporting surfaces, and cross braces rigidly connecting non-adjacent supporting surfaces, the supporting surface or surfaces intermediately located between the non-adjacent supporting surfaces being provided with one or more apertures through which the cross braces extend.

6. In an aircraft, the combination of three or more relatively fixed superposed supporting surfaces, wing posts rigidly connecting adjacent supporting surfaces, and lift and drop wires diagonally arranged between non-adjacent supporting surfaces intermediate the leading edges and trailing edges thereof to rigidly connect them without directly bracing the supporting surface or surfaces intermediately located therebetween.

7. In an aircraft, the combination of three or more relatively fixed supporting surfaces, wing posts rigidly connecting adjacent surfaces, a fore and aft compression member incorporated in each supporting surface as a structural element thereof, and lift and drop wires interbracing the supporting surfaces, the wires in each instance being anchored to the compression members.

8. In an aircraft, the combination of three or more superposed supporting surfaces, wing posts interconnecting the superposed supporting surfaces, and diagonal lift and drop wires interconnecting the uppermost and lowermost wings, the wire lengths in each instance being uninterrupted at the intermediate supporting surface or surfaces although extended beyond it or them at points intermediate its or their leading and trailing edges.

9. In an aircraft, the combination with a fuselage having a cockpit, of a supporting surface extending intermediately across the fuselage in a plane above it, and wing posts extended upwardly and outwardly at an angle from the fuselage to the supporting surface, the arrangement of the wing posts being such that the occupant of the cockpit has an unobstructed range of vision between them.

10. In an aircraft, the combination with a fuselage having a cockpit, of a supporting surface arranged to extend intermediately across the fuselage in advance of the cockpit, and wing posts diverging upwardly from the fuselage to the supporting surface, the divergence of the wing posts being such that the occupant of the cockpit has an unobstructed range of vision forwardly between the diverging wing posts.

11. In an aircraft, the combination of a fuselage, supporting surfaces extended intermediately across the fuselage respectively above, below and intermediate the top and bottom thereof, and wing posts extending divergently upwardly from the fuselage to the uppermost wing.

12. In an aircraft, the combination of superposed relatively fixed supporting surfaces, a wing post comprising a wing connecting portion, and intersecting braces extending from said connecting portion respectively to the connected supporting surfaces, the points of attachment of the intersecting post braces with the wing post being vertically spaced.

13. In an aircraft, the combination of supporting surfaces, a wing post interconnecting superposed supporting surfaces, and intersecting wing post braces arranged to extend rearwardly from said post to the connected surfaces, the points of intersection of the post braces being rearwardly removed from the vertical plane of the wing post.

14. In an aircraft, the combination of supporting surfaces, including wing beams and fore and aft compression members interconnecting the beams of each wing, a wing post arranged to connect superposed supporting surfaces and terminally engage the compression members in proximity to the forward beams of the supporting surfaces, and intersecting wing post braces extended from the wing post respectively to said compression members in proximity to the rear wing beams of said supporting surfaces.

15. A wing structure for airplanes comprising supporting surfaces which include fore and aft compression members as structural elements thereof together with interbracing wing posts integrally united at their extremities to said compression members.

16. A wing structure for airplanes comprising superposed supporting surfaces which include fore and aft compression members as structural elements thereof together with substantially alined wing posts interbracing them by direct connection with said compression members, the compression members being rigidly attached to the wing posts so that the wing structure in its entirety may be made a rigid unified whole.

17. A wing structure for airplanes comprising superposed supporting surfaces including fore and aft compression members as structural elements thereof, together with lift and drop wires interbracing said surface, the wires in each instance being anchored to the compression members.

In testimony whereof I affix my signature.

GLENN H. CURTISS.